(12) United States Patent
Thomas et al.

(10) Patent No.: US 6,802,025 B1
(45) Date of Patent: Oct. 5, 2004

(54) RESTORATION OF A COMPUTER TO A PREVIOUS WORKING STATE

(75) Inventors: Anil Francis Thomas, Redmond, WA (US); Barbara Harder, Bellevue, WA (US); Anthony Chavez, Bothell, WA (US); Kwanjalit S. Marok, Bellevue, WA (US); Nirmal R. Soy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 09/607,740

(22) Filed: Jun. 30, 2000

Related U.S. Application Data (60) Provisional application No. 60/141,757, filed on Jun. 30, 1999.

(51) Int. Cl.[7] ................................. G06F 11/00
(52) U.S. Cl. .......................... 714/15; 711/133
(58) Field of Search .................. 714/15, 16, 13, 714/6, 7, 20, 21, 42, 47, 54; 711/133, 134, 159

(56) References Cited

U.S. PATENT DOCUMENTS

| | | | |
|---|---|---|---|
| 5,276,860 A | * | 1/1994 | Fortier et al. ............ 714/6 |
| 5,367,667 A | | 11/1994 | Wahlquist et al. |
| 5,524,190 A | | 6/1996 | Schaeffer et al. |
| 5,530,801 A | * | 6/1996 | Kobayashi .............. 714/3 |
| 5,638,509 A | * | 6/1997 | Dunphy et al. .......... 714/20 |
| 5,715,462 A | | 2/1998 | Iwamoto et al. |
| 5,778,395 A | * | 7/1998 | Whiting et al. .......... 707/204 |
| 5,974,425 A | * | 10/1999 | Obermarck et al. ...... 707/202 |
| 6,044,475 A | * | 3/2000 | Chung et al. ............ 714/15 |
| 6,105,148 A | * | 8/2000 | Chung et al. ............ 714/16 |
| 6,141,773 A | * | 10/2000 | St. Pierre et al. ....... 714/20 |
| 6,292,808 B1 | * | 9/2001 | Obermarck et al. ...... 707/202 |
| 6,393,583 B1 | * | 5/2002 | Meth et al. .............. 714/12 |
| 6,510,552 B1 | * | 1/2003 | Michel et al. ........... 717/170 |

FOREIGN PATENT DOCUMENTS

| | | |
|---|---|---|
| EP | 0625752 | 11/1994 |
| GB | 2329046 | 3/1999 |
| WO | 9912101 | 3/1999 |

OTHER PUBLICATIONS

Netscape Communications Corporation: "NetHelp 2.0 Authoring Guide" Nethelp 2.0 SDK Documentation, Online! Sep. 3, 1997, pp. 1–21, XP002155041.

(List continued on next page.)

Primary Examiner—Nadeem Iqbal
(74) Attorney, Agent, or Firm—Leydig, Voit & Mayer, Ltd.

(57) ABSTRACT

Methods and systems for backing up and restoring the state of a computer system are disclosed. Computer resource use is minimized by combining the backup methods of file copying and file logging. During backup, copies are stored of those files that are expected to change frequently. For other files, changes are noted in a change log and backup copies may be made if they would be useful when later restoring the files. Restoration proceeds by overwriting the frequently-changing files with stored copies and by undoing the changes to the logged files.

19 Claims, 4 Drawing Sheets

OTHER PUBLICATIONS

C. Levin: "Web Repair Shops" PC Magazine: Trends Online, Online! Aug. 11, 1998, pp. 1–3, XP002155042.

Netscape Communications Corporation: "Establishing trust for downloaded software" Netscape Object Signing, Online! Jul. 2, 1997, pp. 1–18, XP002155043.

Netscape Communications Corporation: "SmartUpdate Developer's Guide" Devedge Online Documentation, Online! Mar. 11, 1999, pp. 1–83, XP002155044.

R. Binns, J. Winstead: "A standard for Linux packages and version numbering" Linux Specification Document, Online! Aug. 24, 1993, XP002155045.

Iffland et al: "ISDN Applications: Their Identification and Development" IEEE Network: The Magazine of Computer Communications, US, IEEE, INC New York, vol. 3, No. 6, Sep. 1, 1989 pp. 6–11.

"Safe Installation of Object–Oriented Class Libraries Common to Multiple Software Products" IBM Technical Disclosure Bulletin, US, IBM Corp. New York, vol. 37, No. 2B, Feb. 1, 1994, pp. 407–409.

Collinson: "Putting old software back together again" EXE vol. 13, No. 6, Nov. 1998 pp. 45–48.

* cited by examiner

```
<FilesToBackUpByCopying>
    <files>
        <include>
            <rec> %windir% \ system.dat </rec>
            <rec> %windir% \ user.dat </rec>
        </include>
    </files>
    <directories>
    </directories>
    <extensions>
    </extensions>
</FilesToBackUpByCopying>
```

FIG. 3a

```
<FilesToBackUpByLoggingChanges>
    <directories>
        <include>
3B02 →     <rec> %windir% </rec>
        </include>
        <exclude>
3B04 →     <rec> %windir% \ Temp </rec>
        </exclude>
    </directories>
    <files>
        <exclude>
3B06 →    { <rec> %windir% \ system.dat </rec>
           { <rec> %windir% \ user.dat </rec>
3B08 →     <rec> %program files% \ backups \ logfile.dat </rec>
        </exclude>
    </files>
    <extensions>
        <include>
3B10 →    { <rec> EXE </rec>
           { <rec> DLL </rec>
        </include>
    </extensions>
</FilesToBackUpByLoggingChanges>
```

FIG. 3b

RESTORATION OF A COMPUTER TO A PREVIOUS WORKING STATE

CROSS REFERENCE TO RELATED APPLICATIONS

This application claims the benefit of provisional patent application 60/141,757, filed Jun. 30, 1999.

TECHNICAL FIELD

This invention relates generally to restoring a computer to a previous state and, more specifically, to restoring a computer to a previous working state by undoing the changes to the computer that occurred since the time of that previous working state.

BACKGROUND OF THE INVENTION

The components of a modern computer, such as operating systems, hardware, and applications, interact with each other in complicated and sometimes unfortunate ways. For example, one component may optimize its own performance by changing certain system parameters but those changes may then cause another component to function poorly or not at all. Components can become so intertwined, and their deleterious effects can be so subtle, that a user often cannot correct a performance problem simply by uninstalling a component, even if he or she somehow figures out which component is causing the problem. The scope of this problem is magnified by the ubiquity of applications downloadable from the Web.

The user often exacerbates an existing problem with repeated attempts at a fix, each attempt altering the computer in further complicated and often unfortunate ways. By the time the user calls in a technical support specialist, often the only options left open are for the user to accept reduced performance and strange behavior or to accept the drastic solution of having his or her computer's disk wiped clean and the operating system and applications reinstalled. While this usually works to restore the computer to a working state, the user must then carefully restore all the safe, but only the safe, settings, options, and preferences that tailor the computer to his or her specific needs. Of course, if the user actually knew which of these were safe and which were not, he or she might not be in this predicament in the first place.

Backup and restore systems have been developed to address these problems. In one model of operation, the state of the computer is periodically saved by storing a copy of those files that together define the state of the computer. When the user notices a problem, the computer is restored to the state it was in at the time a backup was taken by overwriting current files with the copies of those files created by the backup system. In another model of operation, full file copies are not created, rather all changes to the files are noted in a log. During restore, the changes are "undone" one by one until the state of each file at the desired time is recreated. Using either model of operation, a computer will often contain several backups taken at different times and the user will choose to restore to a backup taken shortly before the current troubles began.

Current backup and restore systems, however, consume enormous amounts of computer resources, both disk and processor. Systems based on file copying store a full copy of each file during each backup and this requires a great deal of disk space. Logging systems try to save disk space but do so at the cost of an often unacceptable demand on processor time. If a file changes too often, the change log may exceed the size of the file which negates the disk savings. Additionally, current systems are very difficult for the user to configure and are often inflexible with regard to the user's specific circumstances.

SUMMARY OF THE INVENTION

The above problems and shortcomings, and others, are addressed by the present invention, which can be understood by referring to the specification, drawings, and claims. The present invention is a backup and restore system that minimizes computer resource use by combining the backup methods of file copying and file logging. During backup, copies are stored of those files that are expected to change frequently. For other files, changes are noted in a change log and backup copies may be made if they would be useful when later restoring the files. Restoration proceeds by overwriting the frequently-changing files with stored copies and by undoing the changes to the logged files. This combined technique applies the most suitable backup method to each file, saving on both disk space and processor time.

The combined technique can be implemented in ways that achieve further resource savings. Processor use may be minimized by an implementation of file change monitoring that intercepts calls to the file system. If the call would affect a monitored file, then the change is logged, and a copy of the file is stored, before the operation is allowed to complete. Restoration time may be shortened by preprocessing the log of file changes to eliminate extraneous operations, such as a paired file creation and subsequent deletion. Other aspects of the current invention may be found in the detailed description below.

BRIEF DESCRIPTION OF THE DRAWINGS

While the appended claims set forth the features of the present invention with particularity, the invention, together with its objects and advantages, may best be understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. The following description is based on possible embodiments of the invention and should not be taken as limiting the invention in any way.

Overview of a General-Purpose Computer

Figure 1:
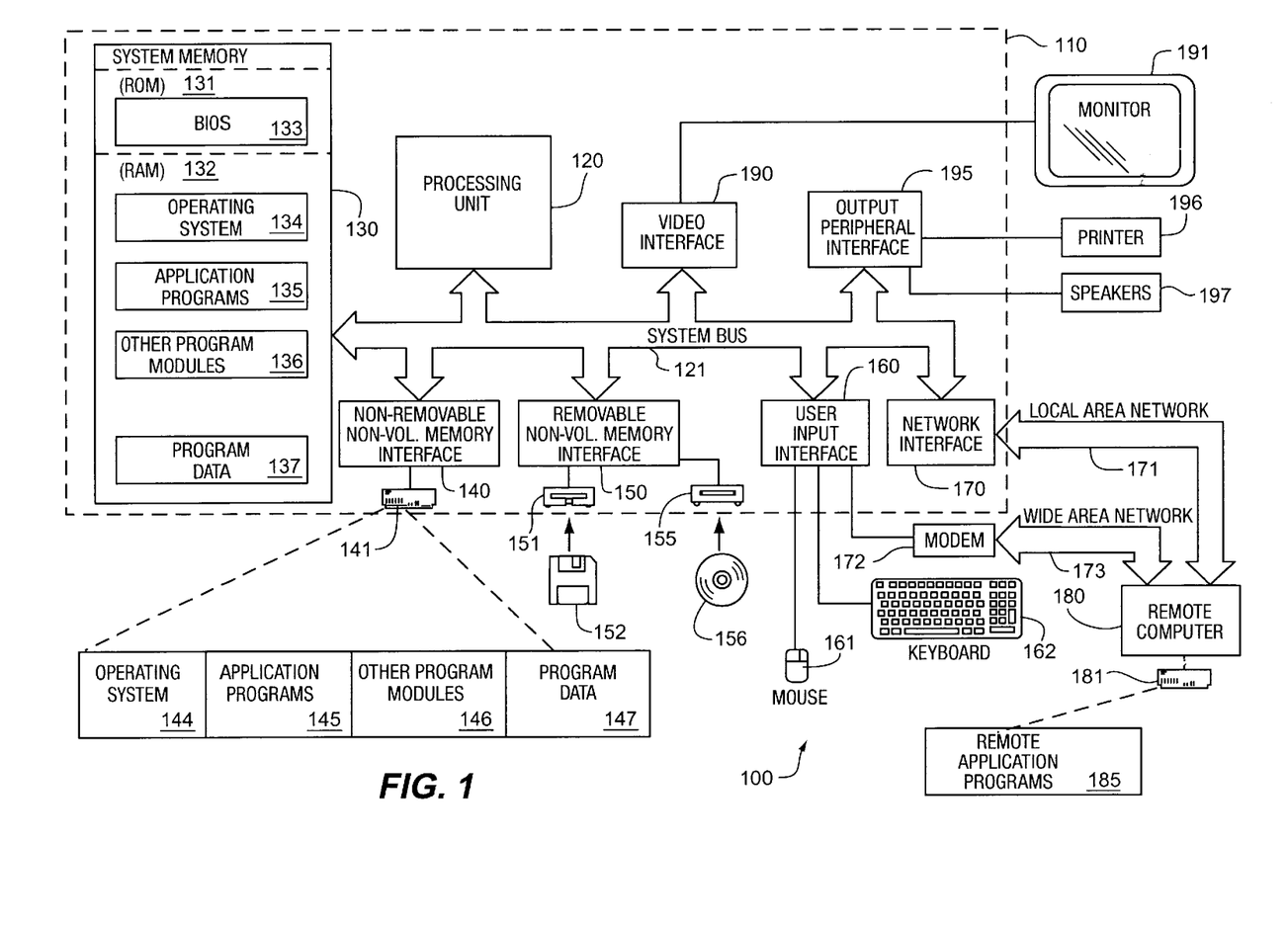
FIG. 1 is a block diagram generally illustrating an exemplary computer system which may support the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include volatile/nonvolatile and removable/non-removable media. By way of example, and not limitation, computer-readable media may include computer storage media and communications media. Computer storage media include volatile/nonvolatile and removable/non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, and infrared media Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well-known in the art.

The computer 110 may also include other removable/non-removable, volatile/nonvolatile computer storage media. By way of example only, FIG. 1 illustrates a hard disk drive 140 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
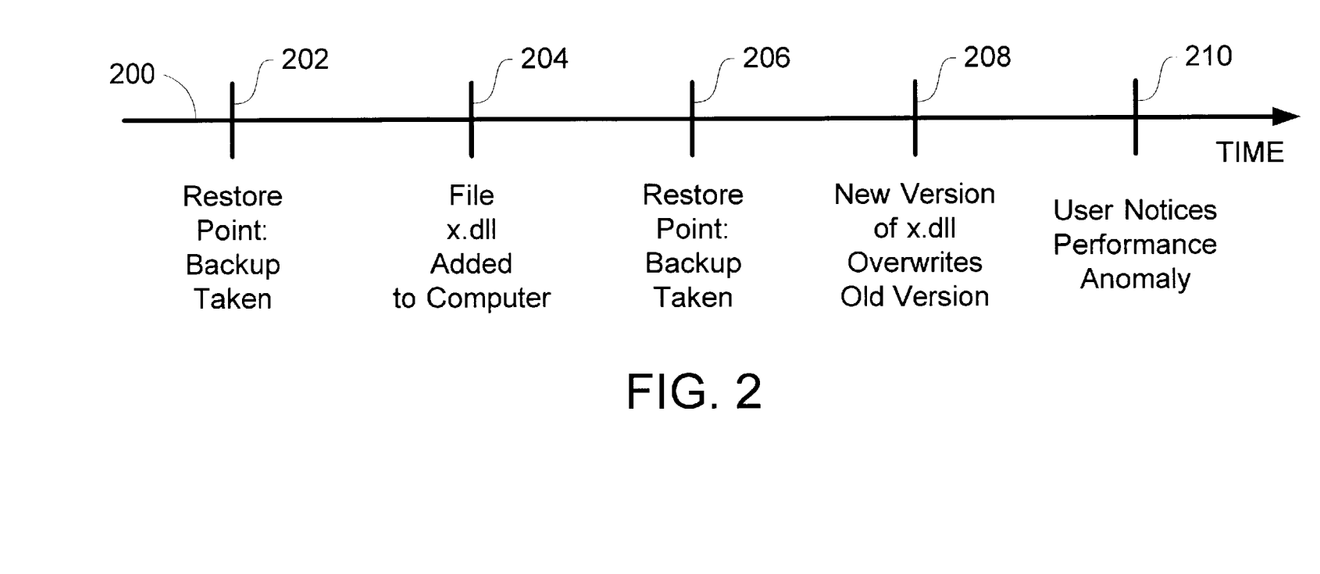
FIG. 2 is a timeline showing an exemplary computer system changing over time, with restore points noted.

Backing Up and Restoring a Computer, According to One Aspect of the Present Invention The general concepts of backing up and restoring a computer, according to one aspect of the present invention, may be understood by referring to FIG. 2. Later sections will discuss in detail some of the points brought up here. In FIG. 2, a timeline 200 illustrates the state of a computer, such as the computer 110 in FIG. 1, changing through time. Specific points in time (202 through 210) are marked to show the progression of a typical backup and restore scenario.

The user's computer has been programmed to automatically make backups, perhaps once a day. The time when a backup is taken is called a "restore point." The restore points 202 and 206 are shown in FIG. 2. For the moment, assume that the user is only interested in backing up and restoring the state of the computer's operating system. Because the computer uses the present invention, the domain of files to be backed up, here the files that together make up the state of the operating system, is divided into two groups: the first group comprises those files that are expected to change rapidly and the second group comprises the rest of the files. In an operating system such as Microsoft's "WINDOWS," the registry files are known to change much more rapidly than the other operating system files. In any case, the files in the two groups are treated very differently by the backup and restore system. At each restore point 202 and 206, files in the first group are copied in their entirety and those copies are stored along with the date and time that this backup was created. Whenever a file in the second group changes, the change is recorded in a change log, also along with the date and time of the change. A backup copy of the file in the second group may also be made if that copy will be useful when later restoring the file.

At time 204, a new operating system file, x.dll, is added to the system. The user may not even be aware of this change: x.dll may have been added during the installation of an application or by the invocation of a Web operation. For purposes of the present invention, the backup system recognizes that this file should be backed up (how it recognizes that is discussed below in the next section, What Is Backed Up and By Which Method) and also recognizes that this file should be backed up by logging its changes (see the next section). Accordingly, the backup system records the creation of this file, and the date and time, in the change log.

File x.dll is overwritten with a new version at time 208. The backup system records this change in the change log and stores a copy of the old version of x.dll, the version existing before time 208. This event shows the overlap between copying and logging changes: while x.dll was not copied at restore points 202 and 206, the change at time 208 is so drastic that unless a full copy of x.dll were made, it would be difficult to restore that file to its state existing before time 208.

Later, at time 210, the user notices a performance anomaly with the computer. The user may suspect x.dll as being the culprit. On the other hand, the user may not even know of that file's existence. However, the user does know that the anomaly did not appear (that is to say, the user knows that the computer worked fine) until sometime after time 208. The user decides to try to eliminate the problem by resetting the operating system to a state it had before time 208. Invoking the restore system, the user is presented with a list of restore points. The user can reset the computer's operating system state to the state recorded in any of these restore points. Here, the user may choose to restore to the state at time 202 or to the state at time 206.

If the user chooses the restore point at time 206, then the restore system first checks to make sure that all file system resources necessary to recreate the state at the time of that restore point are currently accessible by the computer. If so, the restore system then creates a restore map that lists all the changes that must be made to restore the computer. Working from the restore map, the restore system recalls the copies of the files from the first group (the files that were expected to change rapidly) made in conjunction with restore point 206 and overwrites the current versions of those files with the stored copies. The restore map also shows which changes to the logged files must be undone. Those will be the changes made after the restore point at time 206 up until the time the restore system was invoked at time 210. In this case, the previous version of x.dll is recalled from storage and replaces the version installed at time 208. Now that all the files have been restored to their state at time 206, the operating system is restarted so that the changes will take effect. (Note that for some operating systems or for some sets of changes, a restart may not be necessary for the changes to take effect.) The system comes up in the state it had at time 206.

If the user had instead chosen to restore to time 202, the process would have been much the same: the restore map would lead the restore system to recall the copies of the rapidly-changing files made at time 202. Then, undoing changes in the change log, the restore system might first undo x.dll's version change that happened at time 208 and then undo x.dll's installation at time 204. However, the restore map could be optimized by preprocessing the changes stored in the change log (e.g., because x.dll did not exist on the computer at time 202, there is no point in first undoing the version change of time 208). Deleting x.dll suffices to restore its state to that of time 202. Other types of optimizations may become apparent when the restore system scans the change log to create the restore map. The operating system is restarted and comes up in the state it had at time 202.

Note that in this particular implementation scenario, the user cannot restore the system to its state at time 208: the files in the first group (rapidly changing files that are backed up by storing copies at the restore points) may have changed between time 206 and time 208 and those changes are not logged. Thus, the state at time 208 is not recoverable. To allow the user to restore the computer to any possible point in time, all changes to all relevant files would have to be recorded, and that recording process would continuously consume enormous resources. The implementation presently under discussion trades off such capability in return for using far fewer resources. If desired, however, the present invention could be used in an exemplary implementation that backed up all changes.

Note also that in the scenario given above, the backup system only copies and monitors files associated with the operating system state. This scenario is easily expanded to cover important application files, such as executables and internal data files. However, files of user data, such as word processing documents or spreadsheets, would probably not be affected by the backup and restore system. Even changes made after a chosen restore point are not undone. This is an implementation choice, in which the invention is used to create an easy-to-understand backup and restore system used to undo changes to the operating system and applications rather than to create a full data preservation system. The latter type of system could, however, be implemented using the present invention.

What Is Backed Up and BY Which Method

The example implementation developed in the immediately-preceding section backs up only some of the files on the computer (the operating system and application files). Of those files, some are backed up by copying and some by logging changes. That section does not detail why files are treated differently from one another nor does it show how to control the backup and restore systems so that they properly account for the differences. This section takes up the task of explaining the differences and showing how those differences are communicated to the backup and restore systems.

Files are treated differently because doing so saves computer resources. First, a useful distinction can be drawn between operating system and application files, on the one hand, and data files, on the other. Most odd computer behavior arises from conflicts among the files that make up the computer's operating system and its applications, and most problems can be treated by restoring only those files. Although all the files on a computer could be backed up and restored using the present invention, limiting the implementation to treat only operating system and application files covers the majority of problems while preventing the system from consuming more resources than many users would be willing to allocate to it.

Second, another useful distinction can be drawn between those files that change rapidly and those files that are more "sedate." It is more efficient to makes copies of rapidly changing files and record changes to less-rapidly changing files. (Note that some implementations may record a potentially destructive change to a less-rapidly changing file by making a copy of the file before allowing the change to occur.) Combining the techniques of copying and logging, and applying each technique to those files for which the technique is most efficient, saves on both disk space and on processor time. While there is no hard and fast line between "rapidly changing" and "sedate," experience shows which files tend to fall into which category. In Microsoft's "WINDOWS" operating systems, for example, the registry files (system.dat and user.dat) are known to change much more rapidly than other operating system files.

Therefore, according to one implementation of the present invention, rapidly changing files are backed up by making copies of them at the restore points. Less-rapidly changing files are monitored for changes. If a potentially destructive change is about to occur, a copy of the file is stored. Non-destructive changes are logged. Finally, other files (typically user data files) are not backed up at all.

Figure 3A:
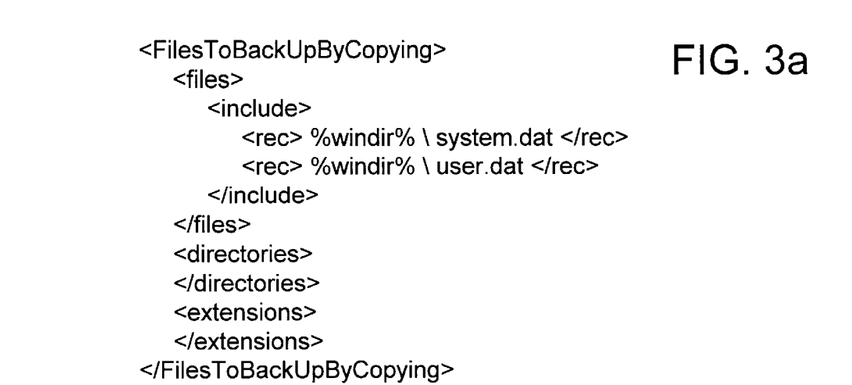
FIG. 3A is an example of the file that tells the backup system which files to back up by making a copy at a restore point.
Figure 3B:
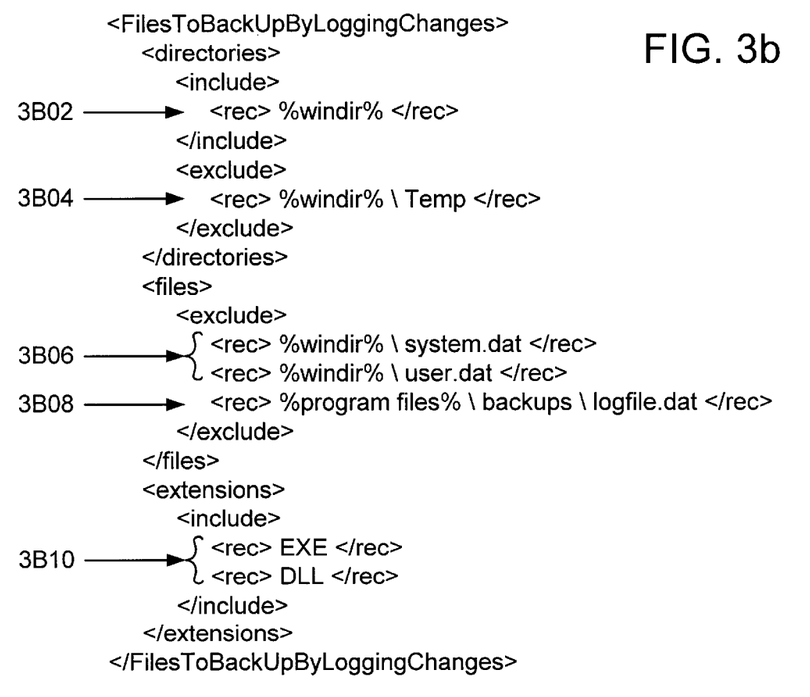
FIG. 3B is an example of the file that tells the backup system which files to back up by noting changes to the files in a change log.

FIGS. 3A and 3B illustrate one way of telling the backup system how to treat the various files. FIG. 3A describes which files are to be backed up by copying at restore points, and FIG. 3B describes which files are to be copied by monitoring and recording changes in a change log. If a file is not described by either of these files, then, by default, that file is not backed up at all.

The files in FIGS. 3A and 3B are written in eXtensible Markup Language (XML). While XML is ideally suited to the task of supplying this control information, the invention does not depend upon the use of XML. For example, a database could easily present the same control information.

First, a note on reading the XML files in FIGS. 3A and 3B: An element begins with a start tag that encloses the element's name in angle brackets (e.g., <ElementName>). The element ends with an end tag which also encloses the element name in angle brackets but this time the element name is preceded by a slash (e.g., </ElementName>). The content of an element is everything between the start tag and the end tag (e.g., <ElementName> Ooorp </ElementName>: the element contains the data Ooorp). Elements may contain other elements.

Turning to FIG. 3A, the file consists of one element usefully named FilesToBackUpByCopying. This element consists of three subelements, the most interesting of which is named files. That element has one subelement named include. This XML file tells the backup system that the only files that are to be backed up by copying are the two files named system.dat and user.dat, both located in the directory specified by the system variable %windir% (which may have the value of, e.g., c:\Windows).

The file in FIG. 3B contains more options than the file in FIG. 3A and is consequently quite a bit longer but it is really no more difficult to understand. The element FilesToBackUpByLoggingChanges uses three ways to specify files to be included or excluded from these backups. A file may by specified by its name (as shown in FIG. 3A), by the directory that contains it, or by its file extension. Line 3B02 includes all files within the directory specified by the system variable %windir%. However, line 3B04 makes an exception to the broad inclusivity of line 3B02. Generally, a more specific rule (such as that in line 3B04) takes precedence over a less specific rule (such as that in line 3B02). Line 3B04 excludes all files within the directory Temp that are in the directory specified by %windir%. Because system.dat and user.dat are included in the file backups of FIG. 3A, they are excluded from these backups by the lines 3B06. Line 3B08 is a safety measure that stops the system from falling into a loop by preventing the system from logging changes made to the change log file itself. Finally, a file can be included or excluded based on its extension. The lines marked by 3B10 include files ending in .EXE or .DLL in the backups.

Altogether, the file in FIG. 3B shows some of the power that XML can provide to carefully distinguish one group of files from another. Depending upon the operating system, the files shown in FIGS. 3A and 3B may become much more complicated or may become even simpler.

Note that the files shown in FIGS. 3A and 3B need not be static. If the invention were used to back up the operating system, then the files in FIGS. 3A and 3B would presumably change with each new release of the operating system and would be included as part of the new release. Also, an API could be developed to allow users to add files to the backup list. Application developers may want to add critical portions of their applications, such as drivers, to the backup list.

When Backups Are Created

Change logging runs whenever the computer is operational so this section is really just about those files backed up by the copying method. That is, this section concerns the making of restore points.

Because users often forget to make backups, the invention may be implemented to run automatically, e.g., once a day. Its operation can be kept transparent to the user by running the backup system only after the computer has been idle for a certain amount of time. On Microsoft's "WINDOWS" operating systems, the MSIDLE.DLL can be used to detect computer idle time. Restore points may also be created before sensitive operations are attempted. If an application (or the user) is about to change an operating system or application file, a backup may be requested for safety's sake. In light of the fact that restoring the computer from backups is not guaranteed to fix a problem, a restore point may be created immediately before performing a restore operation. Then, the effects of the restore can be erased if they were not favorable.

Details of Logging Changes

The method of making a backup by copying a file is straightforward. A copy of the file is made and stored in a backup repository and the existence of that copy, along with the date and time it was made, is recorded in a backup log.

Figure 4:
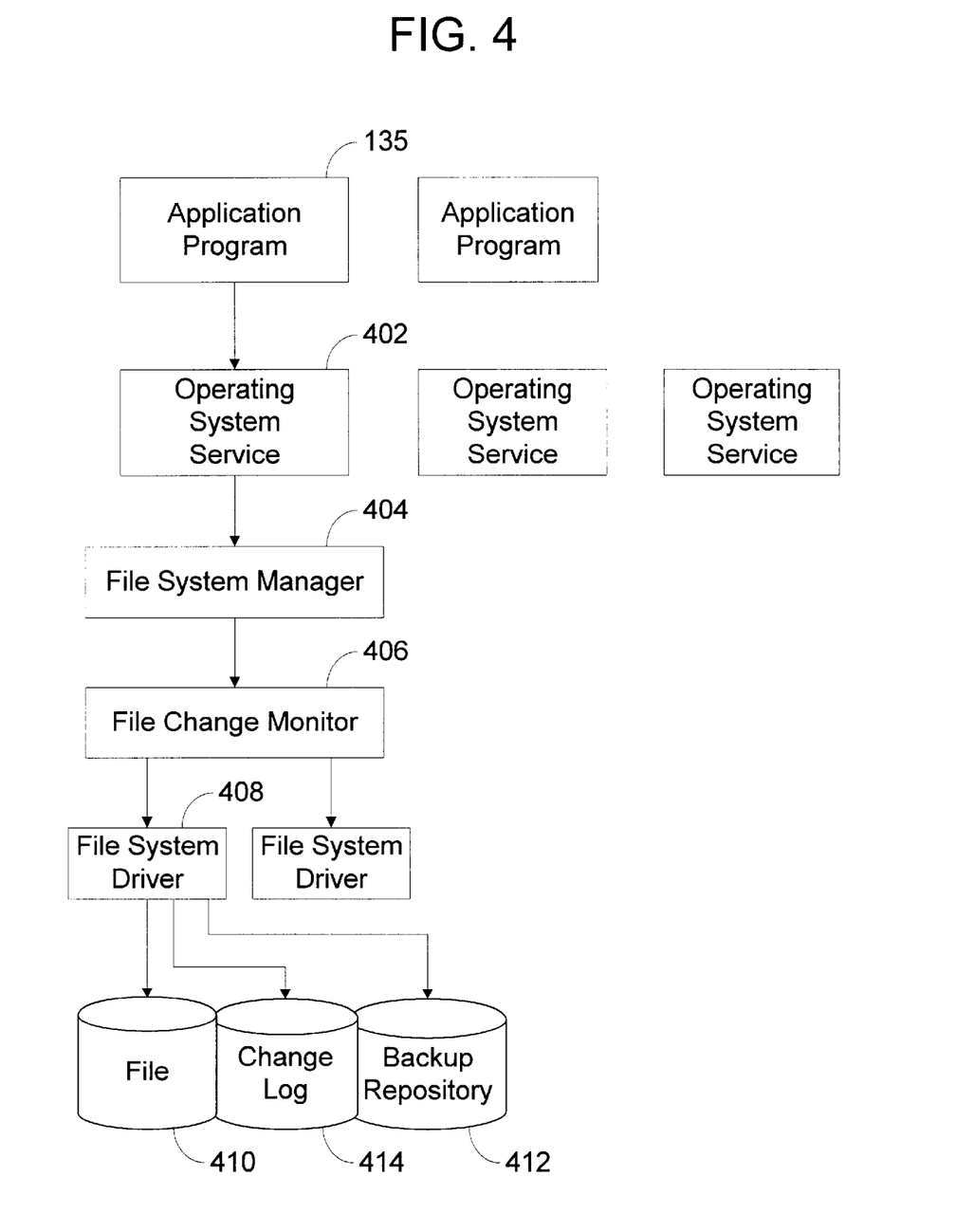
FIG. 4 is a block diagram showing how a file change monitor intercepts file system calls.

Backing up by recording the changes made to a file is somewhat more involved. FIG. 4 illustrates one implementation of this aspect of the present invention. In this implementation, a file change monitor (FCM) program is hooked into the file system to intercept and record changes to the monitored files.

Turning to FIG. 4, an application program 135 running on the computer 110 attempts to access a file. The application program does this by calling one of the services 402 provided by the operating system for this purpose. The file access request is passed to the file system manager 404 which coordinates requests from the various application programs. Without the invention, the file system manager passes the request to the appropriate one of the file system drivers 408 which performs the requested access by manipulating the appropriate one of the files 410. Note that this scenario is basically unchanged if the operating system itself, rather than an application program, attempts to access a file.

The invention may be implemented by hooking the file change monitor 406 into place. The FCM intercepts the calls made by the file system manager 404 to the file system drivers 408. That is to say, whenever the file system manager calls one of the file system drivers, the call is passed for processing to the FCM instead. The FCM examines the file system request to see if it concerns a file that is being monitored for changes (the FCM knows which files these are by reading the contents of the file portrayed in FIG. 3B and described above in the section What Is Backed Up and By Which Method). If the access request does not concern a monitored file, then the FCM exits after passing the request to the file system drivers which process the request in their usual manner. If, on the other hand, the access request involves a monitored file, then the FCM examines the request to see if it has the potential to change the monitored file. If it does not, then the FCM exits after passing the request to the file system drivers for processing. If the request does have the potential to modify a monitored file, then the FCM may first make a copy of the monitored file in the backup repository 412, if that would be useful to preserve the file's data. Whether that is useful depends upon the type of file access operation requested and is discussed in some detail below. Second, the FCM passes the call to the file system drivers which process it as usual. Third and finally, the FCM checks to see if the operation succeeded in modifying the monitored file. If it did, then the FCM records the change in the change log 414.

The following is a more detailed description of what the FCM does for specific file system operations:

File Creation: The FCM writes an entry into the change log 414 after determining that the file was actually created.

File Attribute Change: The FCM writes an entry into the change log after determining that the attribute was successfully changed.

File Modify or File Delete: The FCM makes a copy of the original file in the backup repository 412. Control then passes to the file system drivers 408 to perform the operation. If the operation is successful, then the FCM writes an entry into the change log. Else, the copy of the file just created is removed from the backup repository and no entry is made to the change log.

File Rename: Instead of making a copy of the file, the FCM creates a pointer to the original file. However, if the file rename changes the status of the file from monitored to unmonitored (based upon the contents of the file portrayed in FIG. 3B), then the FCM processes the File Rename as if it were a File Delete. Similarly, if the rename moves a file into the ranks of the monitored, then the FCM processes the File Rename as if it were a File Creation.

Directory Creation, Deletion, or Attribute Change: The FCM writes an entry into the change log after the operation completes successfully.

While this description may make the file change monitor sound cumbersome, it should be borne in mind that the vast majority of the calls to the file system are likely to flow through the FCM without it taking any action. In the few cases in which it must operate, the FCM, implemented as a hook into the file system itself, can operate quickly and with a maximally efficient use of system resources.

Data Store Maintenance

Before the present invention, many backup and restore systems used raw disk partitions to store their backup information. According to one aspect of the present invention, all backup information may be stored in files managed by the computer's file system manager. This change provides considerable advantages in terms of efficient disk space use. The backup system can compress its backup files during periods of low computer use and can surrender the freed up disk space to the file system manager. It can also "prune" old backup files to make room for new backups. As standard files, backup data can be easily placed on a network disk physically removed from the computer, possibly a cheaper and safer solution than storing the backups on the computer itself.

Conclusion

All of the references cited herein, including patents, patent applications, and publications, are hereby incorporated in their entireties by reference. In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

We claim:

1. A method for restoring files that have previously been subjected to a backup process on a computer, wherein the backup process stores copies of some files and records changes made to other files, the method comprising:

for files copied during the backup process, overwriting current versions of the files with copies stored during the backup process; and for files whose changes were recorded during the backup process, undoing the changes.

2. The method of claim 1 further comprising:

monitoring some files to prevent unauthorized changes; and authorizing changes to the monitored files when made in the course of the restore process.

3. The method of claim 1 wherein for files whose changes were recorded during the backup process:

examining the recorded changes to select only those changes that, either singly or in combination with other changes, affect the current state of the file; and undoing only the selected changes.

4. A computer-readable medium having computer-executable instructions for performing the method of claim 1.

5. A method for monitoring access to a file, comprising:

intercepting a call to the file system;

if the intercepted call involves the monitored file, calling a monitoring routine; and upon completion of the monitoring routine, passing the intercepted call to the file system for execution.

6. The method of claim 5 wherein intercepting is run in kernel mode.

7. The method of claim 5 wherein if the intercepted call has the potential for changing the monitored file, then creating a copy of the monitored file.

8. The method of claim 7 wherein if the intercepted call is not successfully executed by the file system, deleting the copy of the monitored file.

9. The method of claim 5 wherein if the intercepted call has the potential for changing the monitored file, recording the change.

10. The method of claim 9 wherein if the intercepted call is not successfully executed by the file system, deleting the record of the change.

11. The method of claim 5 further comprising deciding, based upon the type of the intercepted call, whether to copy the monitored file or to record the change.

12. A computer-readable medium having computer-executable instructions for performing the method of claim 5.

13. A computer-readable medium having stored thereon a data structure, comprising:

a first data field containing data representing a file that a file system monitoring routine should monitor;

a second data field containing data representing a file operation in response to which the file system monitoring routine will log the file operation; and a third data field containing data representing a file operation in response to which the file system monitoring routine will copy the monitored file and record the copying operation.

14. A method for backing up and restoring a state of a computer file system associated with a restore point, the method comprising:

for each file in a first group of files, making a copy of a version of the file associated with the restore point and recording the making of the copy in a restore log;

monitoring files in a second group of files for changes and recording the changes in the restore log;

monitoring some files to prevent unauthorized changes, and authorizing changes to the monitored files when made in the course of restoring the state of the file system;

for each file in the first group of files, overwriting a current version of the file with the copy of the version associated with the restore point; and for each file in the second group of files, undoing the changes recorded in the restore log.

15. A computer-readable medium having computer-executable instructions and computer-readable data for performing the method of claim 14.

16. A method for backing up and restoring a state of a computer file system associated with a restore point, the method comprising:

for each file in a first group of files, making a copy of a version of the file associated with the restore point and recording the making of the copy in a restore log;

monitoring files in a second group of files for changes and recording the changes in the restore log;

for each file in the first group of files, overwriting a current version of the file with the copy of the version associated with the restore point; and for each file in the second group of files, (1) examining the recorded changes to select those changes that, either singly or in combination with other changes, affect a current state of the file, and (2) undoing the selected changes.

17. A computer-readable medium having computer-executable instructions and computer-readable data for performing the method of claim 16.

18. A method for backing up and restoring a state of a computer file system associated with a restore point, the method comprising:

for each file in a first group of files, making a copy of a version of the file associated with the restore point and recording the making of the copy in a restore log;

monitoring files in a second group of files for changes and recording the changes in the restore log;

monitoring some files to prevent unauthorized changes, and authorizing changes to the monitored files when made in the course of restoring the state of the file system;

for each file in the first group of files, overwriting a current version of the file with the copy of the version associated with the restore point; and for each file in the second group of files, (1) examining the recorded changes to select those changes that, either singly or in combination with other changes, affect a current state of the file, and (2) undoing the selected changes.

19. A computer-readable medium having computer-executable instructions and computer-readable data for performing the method of claim 18.

* * * * *

UNITED STATES PATENT AND TRADEMARK OFFICE
CERTIFICATE OF CORRECTION

| | | |
|---|---|---|
| PATENT NO. | : 6,802,025 B1 | Page 1 of 1 |
| APPLICATION NO. | : 09/607740 | |
| DATED | : October 5, 2004 | |
| INVENTOR(S) | : Anil Francis Thomas et al. | |

It is certified that error appears in the above-identified patent and that said Letters Patent is hereby corrected as shown below:

On the Title page of the patent, in the list of Inventors, correct the spelling of the fourth-named inventor to --Kanwaljit S. Marok--.

Signed and Sealed this
Thirtieth Day of April, 2013

Teresa Stanek Rea
*Acting Director of the United States Patent and Trademark Office*